US009389946B2

(12) United States Patent
Higuchi

(10) Patent No.: US 9,389,946 B2
(45) Date of Patent: Jul. 12, 2016

(54) OPERATION MANAGEMENT APPARATUS, OPERATION MANAGEMENT METHOD, AND PROGRAM

(75) Inventor: Yuta Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 14/344,890

(22) PCT Filed: Sep. 14, 2012

(86) PCT No.: PCT/JP2012/074313
§ 371 (c)(1),
(2), (4) Date: Mar. 13, 2014

(87) PCT Pub. No.: WO2013/042789
PCT Pub. Date: Mar. 28, 2013

(65) Prior Publication Data
US 2014/0365829 A1 Dec. 11, 2014

(30) Foreign Application Priority Data

Sep. 19, 2011 (JP) ................................. 2011-203980

(51) Int. Cl.
G06F 11/07 (2006.01)
G06F 11/34 (2006.01)
(52) U.S. Cl.
CPC .......... G06F 11/079 (2013.01); G06F 11/0709 (2013.01); G06F 11/0751 (2013.01); G06F 11/34 (2013.01)
(58) Field of Classification Search
CPC .............. G06F 11/079; G06F 11/0709; G06F 11/3409; G06F 11/3447; G06F 11/0754; G06F 11/34; G06F 11/0751; G06F 11/3452
See application file for complete search history.

(56) References Cited

U.S. PATENT DOCUMENTS

| 7,975,186 B2 | 7/2011 | Kato |
| 8,020,045 B2 | 9/2011 | Morimura et al. |
| 8,286,035 B2 | 10/2012 | Kato |
| 8,352,789 B2 | 1/2013 | Ishiou |

(Continued)

FOREIGN PATENT DOCUMENTS

| JP | 7-30540 A | 1/1995 |
| JP | 2006-340050 A | 12/2006 |

(Continued)

OTHER PUBLICATIONS

Extended European Search Report dated Jul. 9, 2015.

(Continued)

Primary Examiner — Nadeem Iqbal
(74) Attorney, Agent, or Firm — McGinn IP Law Group, PLLC

(57) ABSTRACT

An operation management apparatus includes a correlation destruction detection unit and an evaluation value calculation unit. The correlation destruction detection unit detects correlation destruction on a correlation between metrics of two different server among a plurality of servers executed on one or more processing devices in a system. The evaluation value calculation unit calculates and outputs, when correlation destruction on a correlation between two servers has been detected for inputted measurements of metrics, an evaluation value of the correlation destruction on the basis of a relation between the two servers with respect to the correlation on which the correlation destruction has been detected in the system.

20 Claims, 12 Drawing Sheets

(56) References Cited

U.S. PATENT DOCUMENTS

| | | | |
|---|---|---|---|
| 8,479,048 B2 | 7/2013 | Morimura et al. | |
| 8,611,228 B2 | 12/2013 | Matsunaga et al. | |
| 2009/0052330 A1 | 2/2009 | Matsunaga et al. | |
| 2009/0217099 A1* | 8/2009 | Kato | G06F 11/3409 714/37 |
| 2010/0205483 A1* | 8/2010 | Ishiou | G06F 11/0709 714/26 |
| 2010/0325493 A1 | 12/2010 | Morimura et al. | |
| 2011/0208679 A1 | 8/2011 | Watanabe et al. | |
| 2011/0302305 A1 | 12/2011 | Morimura et al. | |
| 2012/0001916 A1* | 1/2012 | Majors | G06F 17/5009 345/440 |
| 2012/0030522 A1* | 2/2012 | Yabuki | G06F 11/0754 714/47.1 |
| 2012/0185737 A1* | 7/2012 | Ishiou | G06F 11/0751 714/48 |
| 2012/0192014 A1 | 7/2012 | Kato | |

FOREIGN PATENT DOCUMENTS

| | | |
|---|---|---|
| JP | 2009-199533 A | 9/2009 |
| JP | 2010-86115 A | 4/2010 |
| JP | 2010-186310 A | 8/2010 |
| JP | 2011-170802 A | 9/2011 |
| WO | WO 2011/083687 A1 | 7/2011 |

OTHER PUBLICATIONS

Kato Kiyoshi, et al.: "Data Center Operation for Cloud Computing Age Implemented with MasterScope Ver. 8", Jun. 1, 2010, XP055193394, Retrieved from the Internet: URL: http://www.nec.com/en/global/techrep/journal/g10/n02/pdf/100215.pdf [retrieved on Jun. 3, 2015].

International Search Report (ISR) (PCT Form PCT/ISA/210), in PCT/JP2012/071250, dated Sep. 18, 2012.

\* cited by examiner

| CORRELATION | | DEGREE OF CORRELATION DESTRUCTION |
|---|---|---|
| INPUT | OUTPUT | |
| WEB_T1.CPU | WEB_T2.CPU | 5 |
| WEB_T1.CPU | AP_T1.CPU | 3 |
| AP_T1.CPU | DB_T1.CPU | 2 |
| WEB_T1.CPU | DB_T1.CPU | 2 |
| AP_T1.CPU | AP_T2.CPU | 1 |
| DB_T1.CPU | DB_T2.CPU | 1 |

Fig. 7

| SERVER IDENTIFIER | ATTRIBUTE | | | | | |
|---|---|---|---|---|---|---|
| | SystemID | is3Tier | isWeb | isAP | isDB | ... |
| WEB_T1 | Sys1 | 1 | 1 | 0 | 0 | |
| AP_T1 | Sys1 | 1 | 0 | 1 | 0 | |
| DB_T1 | Sys1 | 1 | 0 | 0 | 1 | |
| WEB_T2 | Sys2 | 1 | 1 | 0 | 0 | |
| AP_T2 | Sys2 | 1 | 0 | 1 | 0 | |
| DB_T2 | Sys2 | 1 | 0 | 0 | 1 | |

Fig. 8

| EVALUATION RULE NAME | CONDITIONAL EQUATION | EVALUATION VALUE COEFFICIENT1 | EVALUATION VALUE COEFFICIENT2 |
|---|---|---|---|
| SameSysBoost | SystemID(s1) == SystemID(s2) | 3 | 0.5 |
| ConjBoost1 | is3Tier(s1) ∧ is3Tier(s2) ∧ isWeb(s1) ∧ isAP(s2) | 2 | 0.5 |
| ConjBoost2 | is3Tier(s1) ∧ is3Tier(s2) ∧ isAP(s1) ∧ isDB(s2) | 2 | 0.5 |
| TransReduce | is3Tier(s1) ∧ is3Tier(s2) ∧ isWeb(s1) ∧ isDB(s2) | 0.2 | 0 |
| InvalidRemove1 | is3Tier(s1) ∧ is3Tier(s2) ∧ isWeb(s1) ∧ isWeb(s2) | 0.1 | 0 |
| InvalidRemove2 | is3Tier(s1) ∧ is3Tier(s2) ∧ isAP(s1) ∧ isAP(s2) | 0.1 | 0 |
| InvalidRemove3 | is3Tier(s1) ∧ is3Tier(s2) ∧ isDB(s1) ∧ isDB(s2) | 0.1 | 0 |

Fig. 9

| CORRELATION | | DEGREE OF CORRELATION DESTRUCTION | EVALUATION VALUE |
|---|---|---|---|
| INPUT | OUTPUT | | |
| WEB_T1.CPU | AP_T1.CPU | 3 | 16.0 |
| AP_T1.CPU | DB_T1.CPU | 2 | 11.0 |
| WEB_T1.CPU | DB_T1.CPU | 2 | 6.9 |
| WEB_T1.CPU | WEB_T2.CPU | 5 | 0.5 |
| AP_T1.CPU | AP_T2.CPU | 1 | 0.1 |
| DB_T1.CPU | DB_T2.CPU | 1 | 0.1 |

Fig. 12

| CORRELATION | | DEGREE OF CORRELATION DESTRUCTION | EVALUATION VALUE |
| --- | --- | --- | --- |
| INPUT | OUTPUT | | |
| WEB_T1.CPU | AP_T1.CPU | 3 | 16.0 |
| AP_T1.CPU | DB_T1.CPU | 2 | 11.0 |
| WEB_T1.CPU | DB_T1.CPU | 2 | 6.9 |

Fig. 13

| FAILURE NAME | | WEB_T1 FAILURE |
| --- | --- | --- |

| INPUT | OUTPUT | DETECTION RESULT OF CORRELATION DESTRUCTION |
| --- | --- | --- |
| WEB_T1.CPU | AP_T1.CPU | × |
| WEB_T1.CPU | DB_T1.CPU | × |
| WEB_T1.CPU | WEB_T2.CPU | ○ |
| AP_T1.CPU | DB_T1.CPU | ○ |
| AP_T1.CPU | AP_T2.CPU | ○ |
| DB_T1.CPU | DB_T2.CPU | ○ |
| WEB_T2.CPU | AP_T2.CPU | ○ |
| WEB_T2.CPU | DB_T2.CPU | ○ |
| AP_T2.CPU | DB_T2.CPU | ○ |

Fig. 14

| INPUT | OUTPUT | DETECTION RESULT OF CORRELATION DESTRUCTION OF EVALUATED CORRELATION DESTRUCTION INFORMATION 126 | DETECTION RESULT OF CORRELATION DESTRUCTION OF CORRELATION DESTRUCTION PATTERN 128 |
|---|---|---|---|
| WEB_T1.CPU | AP_T1.CPU | × | × |
| WEB_T1.CPU | DB_T1.CPU | × | × |
| WEB_T1.CPU | WEB_T2.CPU | ○ | ○ |
| AP_T1.CPU | DB_T1.CPU | × | ○ |
| AP_T1.CPU | AP_T2.CPU | ○ | ○ |
| DB_T1.CPU | DB_T2.CPU | ○ | ○ |
| WEB_T2.CPU | AP_T2.CPU | ○ | ○ |
| WEB_T2.CPU | DB_T2.CPU | ○ | ○ |
| AP_T2.CPU | DB_T2.CPU | ○ | ○ |

SIMILARITY = 88%
THE NUMBER OF MATCHING OF
EXISTENCE OR NON-EXISTENCE
OF CORRELATION DESTRUCTION /
THE NUMBER OF CORRELATIONS

OPERATION MANAGEMENT APPARATUS, OPERATION MANAGEMENT METHOD, AND PROGRAM

TECHNICAL FIELD

The invention relates to an operation management apparatus, an operation management method, and a program, in particular an operation management apparatus which detects system failure, an operation management method, and a program thereof.

BACKGROUND ART

Patent literature 1 describes an example of an operation management system which generates a model of a system by using time-series information of system performance and detects a failure of the system by using the generated model.

The operation management system described in Patent literature 1 determines a correlation for each combination among a plurality of metrics on the basis of measurements of the plurality of metrics (performance indexes) in the system, and generates a correlation model including a plurality of correlation functions each indicating the correlation. The operation management system can identify a cause of a failure by a method in which it is determined whether destruction of the correlation (correlation destruction) occurs or not for newly inputted measurements of metrics by using the generated model and a metric on which the correlation destruction is concentrated is detected, for example. The technology for analyzing the cause of a failure on the basis of the correlation destruction is referred to as an invariant analysis.

The invariant analysis focuses on the correlation between metrics instead of largeness of metric values. Therefore, the invariant analysis has advantages such that it does not need to set a threshold value; it can detect failures which cannot be detected by using the threshold value; and a cause of abnormality is identified easily, compared with the case that a failure is detected by comparing each value of the metrics with the threshold value.

As a related technology, Patent literature 2 discloses a technology which detects abnormality of a communication network on the basis of probability distribution of communication quality indexes in a mobile communication network. Patent literature 3 discloses a technology which identifies a cause of a failure using a correlation analysis rule for an event. Patent literature 4 discloses a technology which calculates a degree of certainty of failures in a network and displays the failures in order of the degree of certainty.

CITATION LIST

Patent Literature

[Patent literature 1] Japanese Patent Application Laid-Open 2009-199533
[Patent literature 2] Japanese Patent Application Laid-Open 2006-340050
[Patent literature 3] Japanese Patent Application Laid-Open 2010-086115
[Patent literature 4] Japanese Patent Application Laid-Open H7-030540

SUMMARY OF INVENTION

Technical Problem

When the invariant analysis described in Patent literature 1 is applied to an environment, such as a data center, in which a plurality of independent business systems are mixed, a correlation between these independent business systems may be extracted and correlation destruction on the extracted correlation may be detected. Detecting the correlation destruction on the correlation between the independent business systems may make identification of a cause of a failure difficult, or may be a factor (noise) misleading the identification of a cause of a failure.

An object of the present invention is to solve the problem and provide an operation management apparatus, an operation management method, and a program to obtain an analysis result with high accuracy and without noise in the invariant analysis.

Solution to Problem

An operation management apparatus according to an exemplary aspect of the invention includes: a correlation destruction detection means for detecting correlation destruction on a correlation between metrics of two different servers among a plurality of servers executed on one or more processing devices in a system; and an evaluation value calculation means for calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system.

An operation management method according to an exemplary aspect of the invention includes: detecting correlation destruction on a correlation between metrics of two different servers among a plurality of servers executed on one or more processing devices in a system; and calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system.

A computer readable storage medium according to an exemplary aspect of the invention, records thereon a program, causing a computer to perform a method comprising: detecting correlation destruction on a correlation between metrics of two different servers among a plurality of servers executed on one or more processing devices in a system; and calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system.

Advantageous Effect of Invention

The effect of the present invention is that the analysis result with high accuracy can be obtained in the invariant analysis.

BRIEF DESCRIPTION OF DRAWINGS

FIG. 7 is a diagram showing an example of configuration information 124 of the first exemplary embodiment of the present invention.

FIG. 8 is a diagram showing an example of evaluation rule information 125 of the first exemplary embodiment of the present invention.

FIG. 9 is a diagram showing an example of evaluated correlation destruction information 126 of the first exemplary embodiment of the present invention.

FIG. 12 is a diagram showing an example of the evaluated correlation destruction information 126 of the second exemplary embodiment of the present invention.

FIG. 13 is a diagram showing an example of a correlation destruction pattern 128 of the second exemplary embodiment of the present invention.

FIG. 14 is a diagram showing an example of similarity calculation in the second exemplary embodiment of the present invention.

DESCRIPTION OF EMBODIMENTS (First Exemplary Embodiment)

Next, a first exemplary embodiment of the present invention is described.

Figure 2:
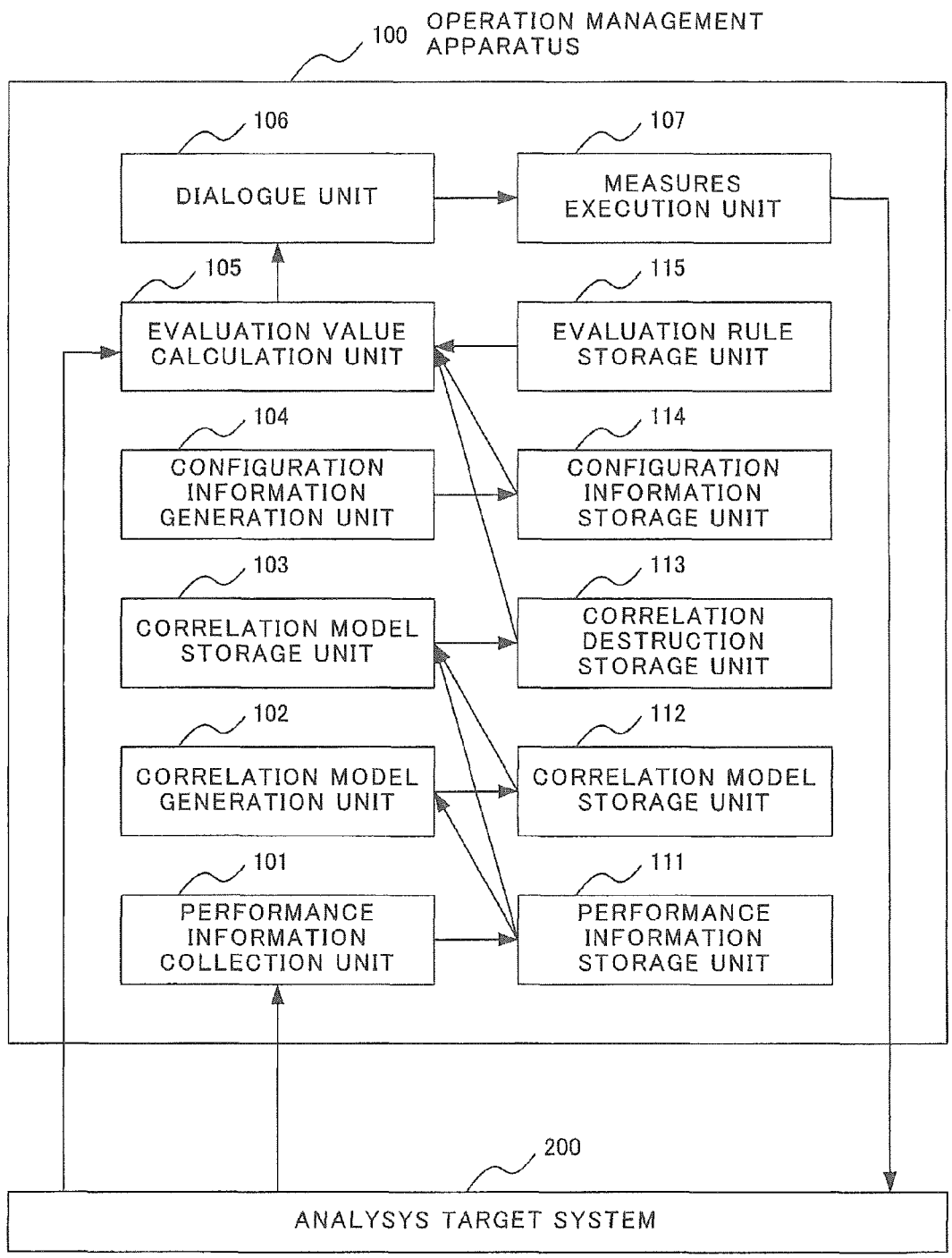
FIG. 2 is a block diagram showing a configuration of an operation management system of the first exemplary embodiment of the present invention.

Initially, a configuration of the first exemplary embodiment of the present invention will be described. FIG. 2 is a block diagram showing a configuration of an operation management system of the first exemplary embodiment of the present invention.

Referring to FIG. 2, the operation management system of the first exemplary embodiment of the present invention includes an operation management apparatus 100 and an analysis target system 200. The operation management apparatus 100 and the analysis target system 200 are connected to each other through a network, or the like.

The analysis target system 200 is a system, such as a data center, which is a target of an invariant analysis performed by the operation management apparatus 100.

Figure 3:
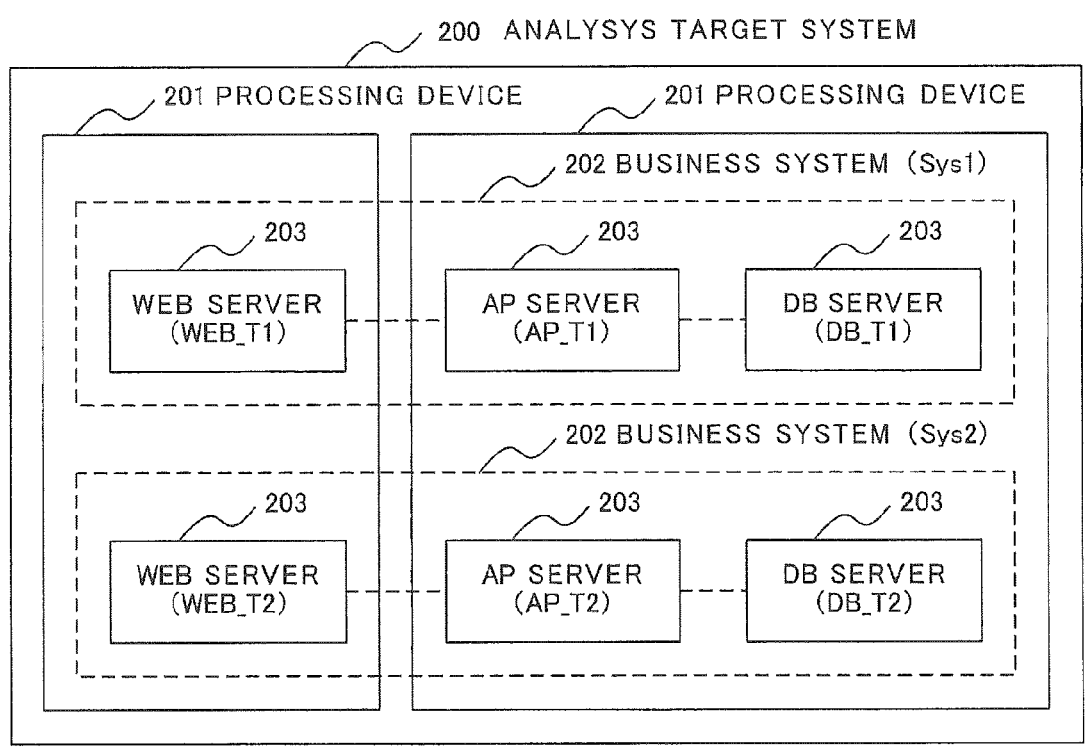
FIG. 3 is a block diagram showing an example of a configuration of an analysis target system 200 of the first exemplary embodiment of the present invention.

FIG. 3 is a block diagram showing an example of a configuration of the analysis target system 200 of the first exemplary embodiment of the present invention.

The analysis target system 200 includes one or more processing devices 201 which are physical computers. On the processing device 201, processes of a plurality of business systems (subsystems) 202, which include, for example, systems configured for respective clients of a data center, are executed. Each of the business systems 202 includes one or more servers 203. The server 203 is a software module executing service processing, such as a WEB server, an application (AP) server, and a database (DB) server in a three-tier model, and is executed in a CPU (Central Processing Unit) on the processing device 201. One server 203 may be arranged in one processing device 201, or a plurality of servers 203 may be arranged in one processing device 201. Each of a plurality of servers 203 configuring one business system 202 may be arranged in different processing devices 201.

In an example of FIG. 3, the analysis target system 200 includes two business systems 202 having system identifiers Sys1 and Sys2, each of which includes the three-tier model having the WEB server, the AP server, and the DB server. The business system 202 with the system identifier Sys1 includes the WEB server, the AP server, and the DB server having server identifiers WEB_T1, AP_T1, and DB_T1, respectively. The apparatus 202 with the system identifier Sys2 includes the WEB server, the AP server, and the DB server having server identifiers WEB_T2, AP_T2, and DB_T2, respectively. WEB servers with the server identifiers WEB_T1 and WEB_T2 are arranged on the processing device 201 having an apparatus identifier SV1, and AP servers and DB servers having the server identifiers AP_T1, AP_T2, and DB_T1, DB_T2 are arranged on the processing device 201 having an apparatus identifier SV2.

The operation management apparatus 100 performs an invariant analysis on the analysis target system 200.

The operation management apparatus 100 includes a performance information collection unit 101, a correlation model generation unit 102, a correlation destruction detection unit 103, a configuration information generation unit 104, an evaluation value calculation unit 105, a dialogue unit 106, a measures execution unit 107, a performance information storage unit 111, a correlation model storage unit 112, a correlation destruction storage unit 113, a configuration information storage unit 114, and an evaluation rule storage unit 115.

The performance information collection unit 101 acquires, from each server 203 in the analysis target system 200, actual measured data (a measured value) of a performance value of a predetermined item which is measured in the server 203 at predetermined time intervals. As the item of the performance value, a usage rate or a usage amount of computer resources on the server 203, such as a CPU usage rate, a memory usage, and a disc usage, is used.

A predetermined item of the performance value in the server 203 is defined as a metric (performance index) and a set of values of a plurality of metrics which are measured at the same time is defined as performance information. The values of the metrics are represented by using a numerical value, like an integer and a decimal number. Each metric is identified by an identifier of the metric (metric identifier). The metric identifier includes the server identifier of the server 203 including the metric represented by the metric identifier and the item of the performance value. For example, the metric identifier WEB_T1.CPU indicates a CPU usage rate of the server 203 with the server identifier WEB_T1. Each server 203 adds the metric identifier to a measure value of a metric, and outputs the measure value to the operation management apparatus 100. The metric corresponds to an element in Patent literature 1.

The correlation model generation unit 102 generates a correlation model 122 including a correlation function indicating a correlation between two different metrics in a plurality of metrics in the analysis target system 200, on the basis of sequential performance information 121, as described in Patent literature 1.

The correlation model storage unit 112 stores the correlation model 122 generated by the correlation model generation unit 102.

The correlation destruction detection unit 103 detects correlation destruction of a correlation for each combination of metrics included in the correlation model 122, for newly inputted performance information, as described in Patent literature 1.

The correlation destruction storage unit 113 stores a detection result of the correlation destruction detected by the correlation destruction detection unit 103 as correlation destruction information 123.

The configuration information generation unit 104 generates configuration information 124 indicating an attribute of each server 203. The attribute is an attribute for determining a relation between the servers 203 in the analysis target system 200.

The configuration information storage unit 114 stores configuration information 124 generated by the configuration information generation unit 104.

The evaluation rule storage unit 115 stores evaluation rule information 125 which is a rule used by the evaluation value calculation unit 105 in order to calculate an evaluation value of the correlation destruction based on the configuration information 124.

The evaluation value calculation unit 105 calculates an evaluation value of the correlation destruction on a correlation on which the correlation destruction has been detected, on the basis of the configuration information 124 and the evaluation rule information 125.

The dialogue unit 106 provides a detection result of correlation destruction to a manager or the like and receives measures against a failure from the manager or the like.

The measures execution unit 107 executes the measures instructed from the manager or the like on the analysis target system 200.

Note that the operation management apparatus 100 may be a computer which includes a CPU and a storage medium storing a program and operates in accordance with control of the program. The performance information storage unit 111, the correlation model storage unit 112, the correlation destruction storage unit 113, the configuration information storage unit 114, and the evaluation rule storage unit 115 may be configured by a separate storage medium or one storage medium.

Next, operation of the operation management apparatus 100 of the first exemplary embodiment of the present invention will be described.

Here, the operation is described in the case that the configuration of the analysis target system 200 is shown as FIG. 3.

It is assumed that, in each server 203 of the analysis target system 200, one metric (CPU usage rate) is used, and the correlation model 122 is generated and the correlation destruction is detected between the metrics of the two different servers 203.

It is also assumed that, although the business system 202 with the system identifier Sys1 and the business system 202 with the system identifier Sys2 in the analysis target system 200 in FIG. 3 are independent each other, processes or characteristics such as an operation time zone of the business systems 202 are similar to each other, and a correlation is extracted between the business systems 202. If the business system 202 with the system identifier Sys1 performs an operation different from a normal operation due to a failure or maintenance, correlation destruction is detected in the correlation between the business systems 202.

Figure 4:
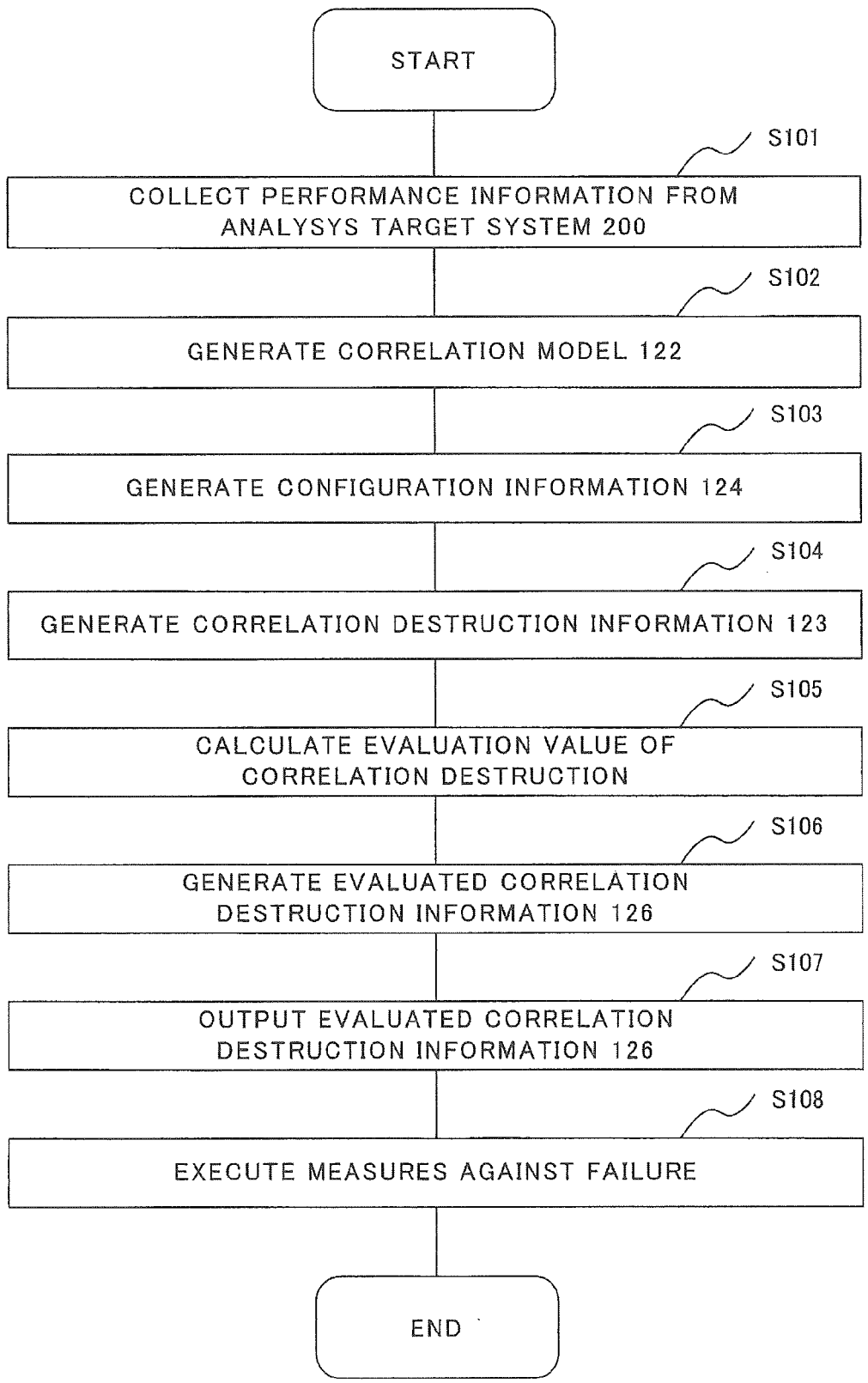
FIG. 4 is a flow chart showing processing in an operation management apparatus 100 of the first exemplary embodiment of the present invention.

FIG. 4 is a flow chart showing processing in the operation management apparatus 100 of the first exemplary embodiment of the present invention.

The performance information collection unit 101 of the operation management apparatus 100 collects performance information from each processing device 201 in the analysis target system 200 (step S101). The performance information collection unit 101 stores the collected performance information in the performance information storage unit 111, as the sequential performance information 121.

The correlation model generation unit 102 refers to the sequential performance information 121 of the performance information storage unit 111, generates the correlation model 122 on the basis of the performance information during a predetermined modeling time period designated by a manager or the like, and stores the generated correlation model 122 in the correlation model storage unit 112 (step S102).

Here, the correlation model 122 includes, for each combination of two metrics in a plurality of metrics, a correlation function (or conversion function) indicating a correlation between the two metrics. The correlation function is a function for predicting, from time series of one metric value, time series of other metric values. The correlation model generation unit 102 determines a coefficient of the correlation function for each combination of metrics on the basis of the sequential performance information 121 during the predetermined modeling time period. The coefficient of the correlation function is determined through system identification processing on time series of measurement values of the metrics as described in Patent literature 1.

Figures 5, 6:
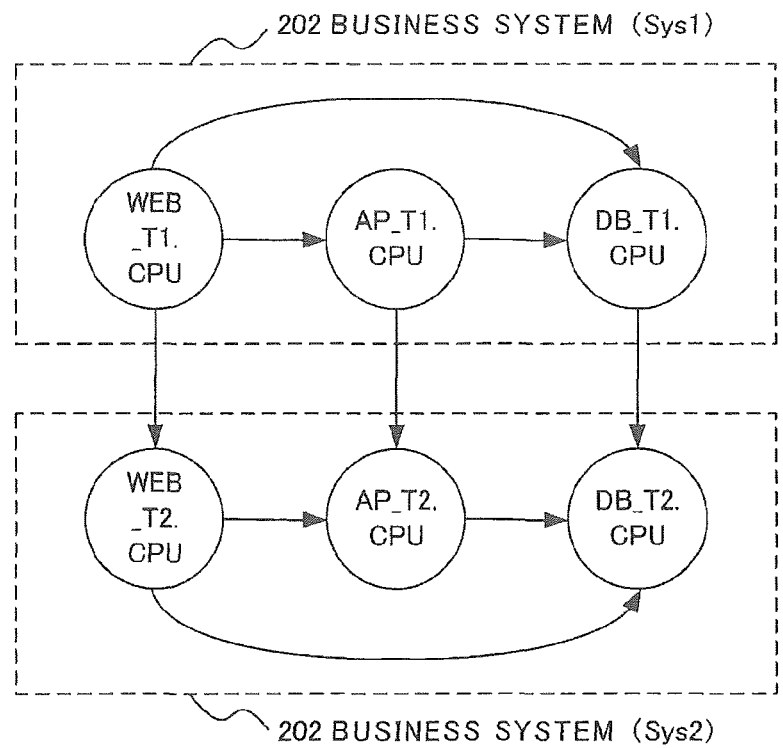
FIG. 5 is a diagram showing an example of a correlation model 122 of the first exemplary embodiment of the present invention.
FIG. 6 is a diagram showing an example of correlation destruction information 123 of the first exemplary embodiment of the present invention.

FIG. 5 is a diagram showing an example of a correlation model 122 of the first exemplary embodiment of the present invention. In FIG. 5, each node represents a metric (CPU usage of each server 203) and an arrow between the nodes represents a correlation from one to the other of the two metrics. For each of the correlations, a correlation function (not shown) is determined. In the example of FIG. 5, correlations among the WEB server, the AP server, and the DB server in each of the business systems 202 with the system identifiers Sys1 and Sys2 are detected. In addition, correlations between the WEB servers, between the AP servers, and between the DB servers of the business systems 202 with the system identifiers Sys1 and Sys2 are detected.

For example, the correlation model generation unit 102 generates the correlation model 122 shown in FIG. 5 for the analysis target system 200 of FIG. 3.

The configuration information generation unit 104 collects an attribute of each server in the analysis target system 200 and generates the configuration information 124 (step S103). The configuration information generation unit 104 stores the generated configuration information 124 in the configuration information storage unit 114.

Here, the configuration information generation unit 104 monitors data transmitted from the server 203 in a communication between the servers 203, between the server 203 and the operation management apparatus 100, or between the server 203 and the other apparatuses (not shown). The configuration information generation unit 104 collects an attribute of each of the servers 203 on the basis of contents of the monitored data. The configuration information generation unit 104 acquires, as the attributes of the servers 203, for example, a system identifier of the business system 202 including the server 203, a system type of the business system 202 (e.g. three-tier model or not), and a server type of the server 203 (e.g. WEB server, AP server, or DB server). These pieces of information are acquired from a server identifier of the server 203 which is included in the data transmitted from the server 203, for example. For example, if "1" indicates the system identifier "Sys1", "T" indicates the system type "three-tier model", and "WEB" indicates the server type "WEB server" in the server identifier "WEB_T1", the configuration information generation unit 104 acquires the system identifier "Sys1", the system type "three-tier model", and the server type "WEB", as the attributes of the server 203 with the server identifier "WEB_T1".

Note that the configuration information generation unit 104 may acquire setting files of the business system 202 or each server 203 from a storage apparatus (not shown), and determine the attribute of each server 203 on the basis of contents of the acquired setting files. Here, the setting files are files which are referred to by the processing device 201 when a software module of each server 203 configuring the business system 202 is executed on the processing device 201. For example, it is assumed that the setting file of the business system 202 include a system identifier of the business system 202, a system type of the business system 202, and server identifiers and server types of the servers 203 configuring the business system 202. In this case, the configuration information generation unit 104 determines, as the attribute of each server 203, the system identifier of the business system 202 including the server 203, the system type of the business system 202, and the server type of the server 203, on the basis of the setting files of the business system 202.

FIG. 7 is a diagram showing an example of the configuration information 124 of the first exemplary embodiment of the present invention. In the configuration information 124 of FIG. 7, as an attribute associated with the server identifier of each server 203, a system identifier (SystemID) of the business system 202 including the server 203, a flag indicating whether the system type of the business system 202 is the three-tier model (is3Tier) or not, and a flag indicating whether the server type of the server 203 is the WEB server, the AP server, or the DB server (isWEB, isAP, isDB), are set. In the flags, 1 is set when the attribute is true, and 0 is set when the attribute is false.

For example, the configuration information generation unit 104 generates the configuration information 124 of FIG. 7 for the analysis target system 200 of FIG. 3.

The correlation destruction detection unit 103 detects correlation destruction of a correlation included in the correlation model 122 by using performance information newly collected by the performance information collection unit 101, and generates the correlation destruction information 123 (step S104). The correlation destruction detection unit 103 stores the generated correlation destruction information 123 in the correlation destruction storage unit 113.

Here, the correlation destruction detection unit 103 inputs a measurement of one metric of two metrics among a plurality of metrics into a correlation function with respect to the two metrics and acquires a prediction value of the other metric. The correlation destruction detection unit 103 detects correlation destruction of the correlation between the two metrics when difference between the acquired prediction value of the other metric and a measurement value of the other metric (a conversion error of the correlation function) is equal to or greater than a predetermined value, as described in Patent literature 1.

The correlation destruction detection unit 103 further provides a degree of correlation destruction indicating a conversion error for the correlation on which the correlation destruction has been detected. For example, the correlation destruction detection unit 103 provides a value of the conversion error as the degree of correlation destruction. The correlation destruction detection unit 103 may provide another value such as a level depending on the conversion error as the degree of correlation destruction, as long as the value is dependent on the largeness of the conversion error.

FIG. 6 is a diagram showing an example of the correlation destruction information 123 of the first exemplary embodiment of the present invention. The correlation destruction information 123 includes a destructed correlation and a degree of correlation destruction of the correlation. Note that the correlation destruction detection unit 103 may set correlations in order of largeness of the degree of correlation destruction in the correlation destruction information 123.

Here, it is assumed that a failure in the WEB server with the server identifier WEB_T1 in the analysis target system 200 of FIG. 3 causes correlation destruction on each correlation in the correlation model 122 of FIG. 5, and correlation destruction shown in FIG. 6 is detected. In the example of FIG. 6, a degree of correlation destruction of a correlation between different business systems 202 (between WEB_T1 and WEB_T2) is large and is presented at the top of the correlation destruction information 123.

For example, the correlation destruction detection unit 103 stores the correlation destruction information 123 shown in FIG. 6 in the correlation destruction storage unit 113.

Next, the evaluation value calculation unit 105 calculates an evaluation value for the correlation destruction detected in step S104 on the basis of the configuration information 124 and the evaluation rule information 125 (step S105).

FIG. 8 is a diagram showing an example of the evaluation rule information 125 of the first exemplary embodiment of the present invention. In the example of FIG. 8, in association with a name of an evaluation rule (evaluation rule name), a conditional equation of the evaluation rule and an evaluation value coefficient (evaluation value coefficient 1 and evaluation value coefficient 2), which is used when the conditional equation is true, are defined in the evaluation rule information 125.

In the evaluation rule information 125 of FIG. 8, conditional equations s1 and s2 represent server identifiers of two servers 203 with respect to a destructed correlation. Each of the server identifiers of the two servers 203 with respect to the destructed correlation is extracted, for example, from each of metric identifiers of two metrics with respect to the destructed correlation. SystemID( ) is a function which extracts a system identifier (SystemID) of the business system 202 for a server identifier given as an argument, from the configuration information 124 of FIG. 7. A is3Tier( ), a isWEB( ), a isAP( ), and a isDB( ) are functions which extract flags indicating the WEB server, the AP server, and the DB server of the three-tier model for a server identifier given as an argument, from the configuration information 124 of FIG. 7, respectively. A binomial operator "=" indicates true in the case integer values of both sides are equal to each other, and is false in the other case. A binomial operator "A" indicates true in the case both sides are true, and is false in the other case.

The evaluation value calculation unit 105 evaluates a conditional equation of each evaluation rule in the evaluation rule information 125 for a set of two servers 203 with respect to a destructed correlation, and extracts evaluation value coefficients (evaluation value coefficient 1 and evaluation value coefficient 2) associated with the evaluation rule indicating true. The evaluation value calculation unit 105 calculates an evaluation value according to Equation 1 using the extracted evaluation value coefficients.

$$\text{Evaluation value} = \text{a degree of correlation destruction} \times \qquad \text{[Equation 1]}$$
$$(\text{total of extracted evaluation value coefficients 1}) +$$
$$(\text{total of extracted evaluation value coefficients 2})$$

In the evaluation rule information 125 of FIG. 8, it is determined whether identifiers of the business system 202 including each of two servers 203, with respect to a destructed correlation, are equal or not, according to the conditional equation of the evaluation rule with evaluation rule name SameSysBoost. When the conditional equation is true (when identifiers of the business system 202 are equal), the evaluation value coefficient 1 "3" and the evaluation value coefficient 2 "0.5" are extracted.

Therefore, in the case that the identifiers of the business system 202 including each of the two servers 203, with respect to a destructed correlation, are equal, the evaluation value becomes large compared with the case that the identifiers are different.

It is also determined whether the two servers 203 with respect to the correlation have direct access relation to each other in the three-tier model or not, according to the conditional equation of the evaluation rule with evaluation rule names ConjBoost1 and ConjBoost2. The direct access relation means that, like the WEB server and the AP server, or the AP server and the DB server, for example, one server 203 directly accesses the other server 203 to use the service of the other server 203. When the conditional equation is true (when having the direct access relation), the evaluation value coefficient 1 "2" and the evaluation value coefficient 2 "0.5" are extracted.

It is also determined whether the two servers 202 with respect to the correlation have indirect access relation to each other in the three-tier model or not, according to the conditional equation of the evaluation rule having evaluation rule name TranceReduce. The indirect access relation means that, like the WEB server and the DB server, for example, one server 203 indirectly uses the other server 203. When the conditional equation is true (when having the indirect access relation), the evaluation value coefficient 1 "0.2" and the evaluation value coefficient 2 "0" are extracted.

Therefore, in the case that the two servers 203 with respect to the destructed correlation have the direct access relation to each other, the evaluation value becomes large compared with the case that the two servers 203 have the indirect access relation to each other. When the two servers 203 with respect to the destructed correlation have the direct or indirect access relation to each other, the evaluation value becomes large compared with the case that two servers 203 does not have any one of the direct or indirect access relation to each other.

Next, the evaluation value calculation unit 105 generates evaluated correlation destruction information 126 by adding the evaluation value to correlation destruction in the correlation destruction information 123 (step S106).

FIG. 9 is a diagram showing an example of the evaluated correlation destruction information 126 of the first exemplary embodiment of the present invention. The evaluated correlation destruction information 126 includes a destructed correlation, a degree of correlation destruction of the correlation, and an evaluation value of the correlation. The evaluation value calculation unit 105 may arrange correlations in order of largeness of the evaluation value. The evaluation value calculation unit 105 may set only a correlation having the evaluation value being equal to or greater than a predetermined threshold value.

In an example of FIG. 9, an evaluation value of a correlation between different business systems 202 (between WEB_T1 and WEB_T2) is small, and the correlation is placed lower in the evaluated correlation destruction information 126. On the other hand, an evaluation value of a correlation between the servers 203 which have a direct access relation to each other (between WEB_T1 and AP_T1, between AP_T1 and DB_T1) is large, and is placed higher in the evaluated correlation destruction information 126.

For example, the evaluation value calculation unit 105 generates the evaluated correlation destruction information 126 shown in FIG. 9.

Next, the evaluation value calculation unit 105 outputs the evaluated correlation destruction information 126 to a manager or the like through the dialogue unit 106 (step S107). The measures execution unit 107 executes measures against the failure received from the manager or the like through the dialogue unit 106 in the analysis target system 200 (step S108).

For example, the evaluation value calculation unit 105 outputs the evaluated correlation destruction information 126 shown in FIG. 9 to the manager or the like.

In the above described correlation destruction information 123 shown in FIG. 6, a destructed correlation is presented with a degree of correlation destruction. When correlation destruction information 123 is presented, like Patent literature 1, the manager or the like recognizes that a failure may occur on the WEB server in the business system 202 with the system identifier Sys1 or on the WEB server in the business system 202 with the system identifier Sys2. The manager or the like needs to investigate a cause of the failure not only on the business system 202 with the system identifier Sys1 but also on the business system 202 with the system identifier Sys2 which does not actually need to be investigated.

However, in the evaluated correlation destruction information 126 shown in FIG. 9, a destructed correlation is presented with the evaluation value. When the evaluated correlation destruction information 126 of FIG. 9 is presented, the manager or the like recognizes that a failure may occur on the WEB server or the AP server in the business system 202 with the system identifier Sys1 which are related to the correlation having a large evaluation value, on the basis of the evaluated correlation destruction information 126 of FIG. 9. The manager or the like can therefore limit an investigation of the cause of the failure to the business system 202 with the system identifier Sys1.

As described above, the operation of the first exemplary embodiment of the present invention is completed.

Figure 1:
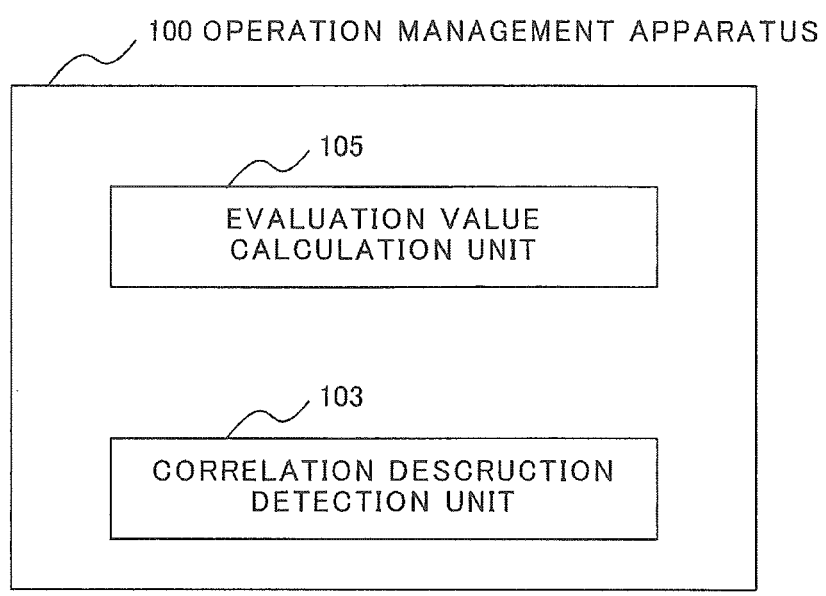
FIG. 1 is a block diagram showing a characteristic configuration according to a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, an operation management apparatus 100 of the first exemplary embodiment of the present invention includes a correlation destruction detection unit 103 and an evaluation value calculation unit 105.

The correlation destruction detection unit 103 detects correlation destruction on a correlation between metrics of two different servers 203 among a plurality of servers 203 executed on one or more processing devices in a system. The evaluation value calculation unit 105 calculates and outputs, when correlation destruction on a correlation between two servers 203 has been detected for inputted measurements of metrics, an evaluation value of the correlation destruction on the basis of a relation between the two servers 203 with respect to the correlation on which the correlation destruction has been detected in the system.

According to the first exemplary embodiment of the present invention, an analysis result with high accuracy can be obtained in the invariant analysis. The reason is that the evaluation value calculation unit 105 calculates, on the basis of the relation between two servers 203 with respect to a destructed correlation in the analysis target system 200, an evaluation value of the correlation destruction of the correlation. Thereby, a manager or the like can remove a correlation (noise) which is a factor misleading identification of a cause of a failure, and can investigate the cause of the failure on the basis of a correlation which is effective to identify the cause of the failures. Therefore, the manager or the like can quickly identify the cause of the failure.

(Second Exemplary Embodiment)

Next, a second exemplary embodiment of the present invention will be described.

The second exemplary embodiment of the present invention is different from the first exemplary embodiment of the present invention in that the operation management apparatus 100 calculates similarity between existence or non-existence of correlation destruction for respective of a plurality of correlations between the servers 203 at the time of a failure in the past and existence or non-existence of correlation destruction therefor having an evaluation value being equal to or greater than a predetermined value for inputted measurements of metrics.

Figure 10:
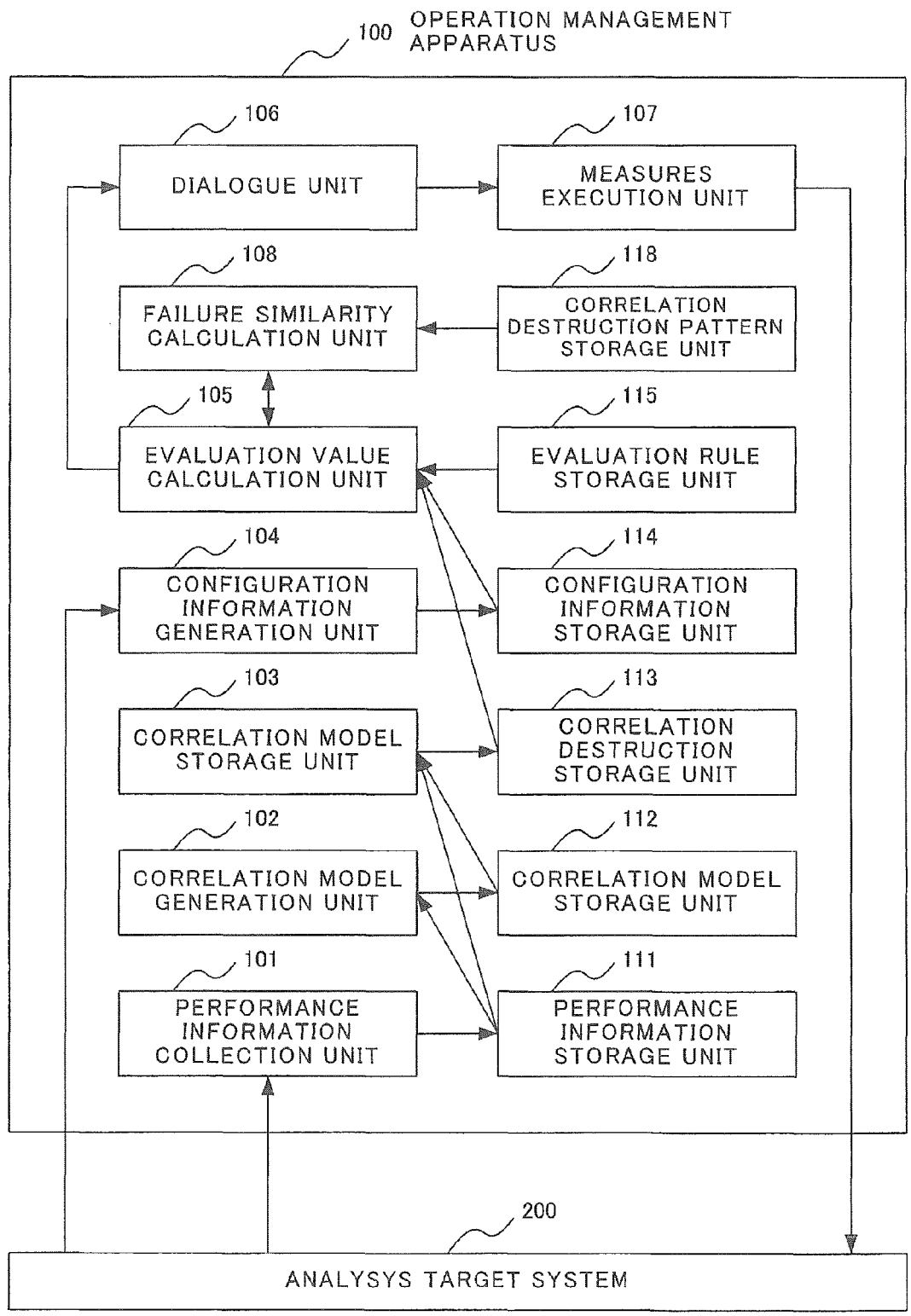
FIG. 10 is a block diagram showing a configuration of an operation management system of a second exemplary embodiment of the present invention.

Initially, a configuration of the second exemplary embodiment of the present invention will be described. FIG. 10 is a block diagram showing a configuration of an operation management system of the second exemplary embodiment of the present invention.

Referring to FIG. 10, the operation management apparatus 100 of the second exemplary embodiment of the present invention includes a failure similarity calculation unit 108 and a correlation destruction pattern storage unit 118, in addition to the configuration of the operation management apparatus 100 of the first exemplary embodiment of the present invention.

The correlation destruction pattern storage unit 118 stores a correlation destruction pattern 128 indicating a detection result of correlation destruction at the time of a failure in the past.

The failure similarity calculation unit 108 calculates similarity between existence or non-existence of correlation destruction for respective of a plurality of correlations between the servers 203 indicated by the correlation destruction pattern 128 and existence or non-existence of correlation destruction therefor indicated by the evaluated correlation destruction information 126.

Next, an operation of the operation management apparatus 100 of the second exemplary embodiment of the present invention will be described.

Figure 11:
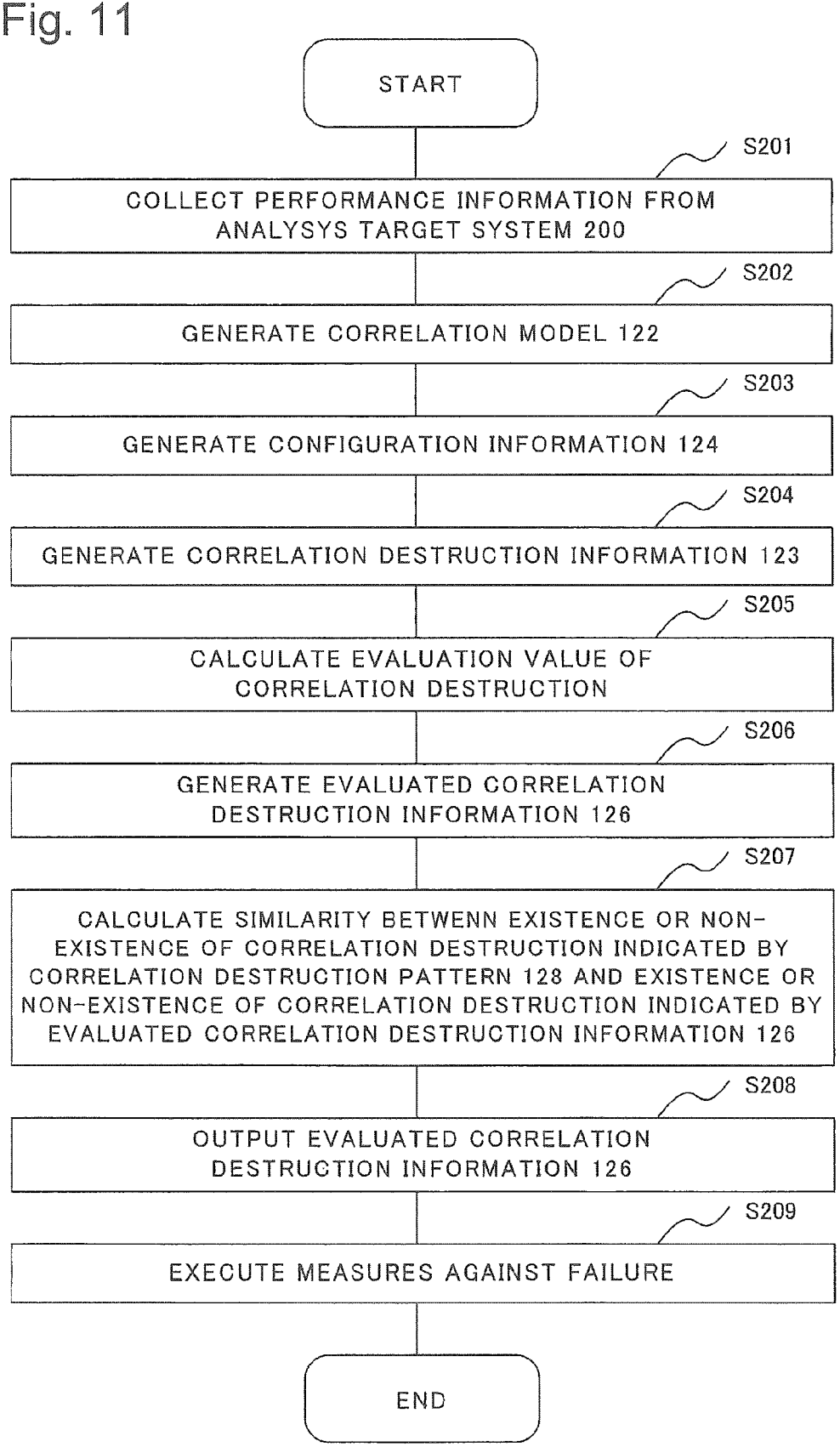
FIG. 11 is a flow chart showing processing in the operation management apparatus 100 of the second exemplary embodiment of the present invention.

FIG. 11 is a flow chart showing processing in the operation management apparatus 100 of the second exemplary embodiment of the present invention. The processes from collection of performance information by the performance information collection unit 101 to generation of the evaluated correlation destruction information 126 (step S201 to step S206) are the same as the first exemplary embodiment of the present invention (step S101 to step S106).

In the second exemplary embodiment of the present invention, the evaluation value calculation unit 105 sets a correlation having an evaluation value being equal to or greater than a predetermined threshold value on the evaluated correlation destruction information 126.

FIG. 12 is a diagram showing an example of the evaluated correlation destruction information 126 of the second exemplary embodiment of the present invention. Here, it is assumed that the evaluation value calculation unit 105 sets a correlation having an evaluation value being equal to or greater than one on the evaluated correlation destruction information 126.

In this case, the evaluation value calculation unit 105 generates the evaluated correlation destruction information 126 of FIG. 12 for the correlation destruction information 123 of FIG. 6.

The failure similarity calculation unit 108 calculates similarity between existence or non-existence of correlation destruction for respective of a plurality of correlations between the servers 203 indicated by the correlation destruction pattern 128 and existence or non-existence of correlation destruction therefor indicated by the evaluated correlation destruction information 126 (step S207).

FIG. 13 is a diagram showing an example of the correlation destruction pattern 128 of the second exemplary embodiment of the present invention. As shown in FIG. 13, the correlation destruction pattern 128 includes one or more sets of a name of a failure (failure name) which occurred in the past and a list of correlation destruction detection results for respective correlations in the correlation model 122 at the time of the failure. In the correlation destruction detection results of FIG. 13, "o", indicates the non-existence of correlation destruction and "x" indicates the existence of correlation destruction.

The correlation destruction pattern 128 may be generated, on the basis of the evaluated correlation destruction information 126 at the time of failure occurrence in the past, by setting the existence of correlation destruction to a correlation having an evaluation value being equal to or greater than a predetermined threshold value and setting the non-existence of correlation destruction to the other correlation.

The failure similarity calculation unit 108 calculates a matching rate between existence or non-existence of correlation destruction indicated by the evaluated correlation destruction information 126 and existence or non-existence of correlation destruction indicated by the correlation destruction pattern 128, as similarity.

FIG. 14 is a diagram showing an example of similarity calculation in the second exemplary embodiment of the present invention. When the evaluated correlation destruction information 126 of FIG. 12 is compared with the correlation destruction pattern 128 of the failure name "WEB_T1 failure" in FIG. 13, statuses of existence or non-existence of correlation destruction match each other for eight correlations as shown in FIG. 14. In this case, similarity (a matching degree of existence or non-existence of correlation destruction) is calculated as the number of matching of existence or non-existence of correlation destruction/the number of correlations=88%.

Note that the failure similarity calculation unit 108 may calculate the similarity by using a different method, as long as the similarity between existence or non-existence of correlation destruction for respective of a plurality of correlations between the servers 203 at the time of a failure in the past and existence or non-existence of correlation destruction therefor in the evaluated correlation destruction information 126 can be calculated. For example, the failure similarity calculation unit 108 may use a ratio of destructed correlations in the evaluated correlation destruction information 126 to destructed correlations in the correlation destruction pattern 128, as the similarity. The correlation destruction detection unit 103 may classify correlations included in the correlation model 122 into some groups and calculate similarity of distribution of the number of correlation destruction for each of the groups.

Next, the evaluation value calculation unit 105 outputs the evaluated correlation destruction information 126 to a manager or the like through the dialogue unit 106 (step S208). Here, if there is a failure having the similarity calculated in the step S207 being more than a predetermined threshold value, the evaluation value calculation unit 105 outputs a failure name of the failure and the similarity with the evaluated correlation destruction information 126. The measures execution unit 107 executes measures against the failure received from the manager or the like through the dialogue unit 106, in the analysis target system 200 (step S209).

For example, the evaluation value calculation unit 105 outputs the failure name "WEB_T1 failure" of the similar failure and the similarity "88%" with the evaluated correlation destruction information 126 of FIG. 12. The manager or the like can recognize that the correlation destruction indicated by the evaluated correlation destruction information 126 of FIG. 12 may be caused by a failure on the WEB server with the server identifier WEB_T1.

As described above, the operation of the second exemplary embodiment of the present invention is completed.

According to the second exemplary embodiment of the present invention, an accurate cause of a failure can be presented to the manager in the invariant analysis. The reason is that the failure similarity calculation unit 108 calculates similarity between existence or non-existence of correlation destruction for respective of a plurality of correlations between the servers 203 at the time of a failure in the past, which is included in the correlation destruction pattern 128, and existence or non-existence of correlation destruction therefor having an evaluation value being equal to or greater than a predetermined value for inputted measurements of metrics.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the exemplary embodiments of the present invention, the attribute in the configuration information 124 of FIG. 7 and the evaluation rule in the evaluation rule information 125 of FIG. 8 are used. However, other attributes and evaluation rules with respect to a relation between a plurality of servers 203 in the analysis target system 200 may be used. For example, when a load balancing configuration (server group) with respect to processing of the same server type is configured by arranging a plurality of the servers 203 of the same server type in different processing devices 201 respectively, it may be detected whether the two servers 203 with respect to a destructed correlation are included in the same server group or not by using an attribute to identify whether the servers 203 are included in the same server group or not (e.g. identifier of server group). In this case, the evaluation rule may be set in such a way that the evaluation value in the case that the two servers 203 with respect to the destructed correlation are included in the same server group is greater than the evaluation value in the case that the two servers 203 are not included in the same server group.

In the exemplary embodiments of the present invention, in the conditional equation of the evaluation rule information 125, the functions and the operators shown in FIG. 8 are used. However, other functions, other comparison operators, or other logic operators to acquire contents of the configuration information 124 may also be used.

In the exemplary embodiments of the present invention, the evaluation value is calculated using the evaluation value coefficient 1, the evaluation value coefficient 2 which are acquired from the evaluation rule in the evaluation rule information 125 shown in FIG. 8 and equation 1. However, as long as the evaluation value can be calculated depending on a relation between the servers 203 in the analysis target system 200, the evaluation value may be calculated by using other equations. For example, one evaluation value coefficient may be used for each evaluation rule, or the evaluation value may be calculated without the degree of correlation destruction.

In the exemplary embodiments of the present invention, the case that one metric is used in each server 203 of the analysis target system 200, and the correlation model 122 is generated and the correlation destruction is detected between the metrics of two different servers 203 is described. However, a plurality of metrics may be used in each server 203 of the analysis target system 200, and the correlation model 122 may be generated and the correlation destruction is detected among the plurality of metrics of the two different servers 203. In this case, the evaluation value is calculated for each of a plurality of destructed correlation between the two different servers 203, as well as the exemplary embodiments of the present invention.

This application is based upon and claims the benefit of priority from Japanese Patent Application No. 2011-203980, filed on Sep. 19, 2011, the disclosure of which is incorporated herein in its entirety by reference.

REFERENCE SIGNS LIST

100 operation management apparatus
101 performance information collection unit
102 correlation model generation unit
103 correlation destruction detection unit
104 configuration information generation unit
105 evaluation value calculation unit
106 dialogue unit
107 measures execution unit
108 failure similarity calculation unit
111 performance information storage unit
112 correlation model storage unit
113 correlation destruction storage unit
114 configuration information storage unit
115 evaluation rule storage unit
118 correlation destruction pattern storage unit
121 sequential performance information
122 correlation model
123 correlation destruction information
124 configuration information
125 evaluation rule information
126 evaluated correlation destruction information
128 correlation destruction pattern
200 analysis target system
201 processing device
202 business system
203 server

What is claimed is:
1. An operation management apparatus comprising:
a correlation destruction detection unit which detects correlation destruction which is a variant of a correlation between metrics of two different servers among a plurality of servers executed on one or more processing devices in a system; and
an evaluation value calculation unit which calculates and outputs, when correlation destruction on a correlation between two servers has been detected for inputted measurements of metrics, an evaluation value of the correlation destruction on the basis of a relation between the two servers with respect to the correlation on which the correlation destruction has been detected in the system, wherein the system includes a plurality of subsystems each of which is a group of one or more servers, and the evaluation value calculation unit calculates the evaluation value on the basis of whether subsystems to which the two servers with respect to the correlation on which the correlation destruction has been detected belong are the same or not, as the relation between the two servers.

2. The operation management apparatus according to claim 1, wherein the evaluation value calculation unit, in the case that the subsystems to which the two servers with respect to the correlation on which the correlation destruction has been detected belong are the same, calculates the evaluation value using a coefficient greater than a coefficient used in the case that the subsystems are different.

3. The operation management apparatus according to claim 1, wherein the evaluation value calculation unit, in the case that, as the relation between the two servers, one server of the two servers with respect to the correlation on which the correlation destruction has been detected uses the other server without going through another server, calculates the evaluation value using a coefficient greater than a coefficient used in the case that the one server uses the other server through another server.

4. The operation management apparatus according to claim 3, wherein the evaluation value calculation unit determines whether the one server uses the other server without going through or going through another server on the basis of a type of each of the two servers with respect to the correlation on which the correlation destruction has been detected.

5. The operation management apparatus according to claim 1, wherein the evaluation value calculation unit outputs the correlation having the evaluation value being equal to or greater than a predetermined value among the correlations on which the correlation destruction has been detected between the servers.

6. The operation management apparatus according to claim 1, further comprising a failure similarity calculation unit which calculates and outputs similarity between existence or non-existence of the correlation destruction for respective of a plurality of the correlations between the servers at the time of a failure and existence or non-existence of the correlation destruction therefore having the evaluation value being equal to or greater than a predetermined value for the inputted measurements of metrics.

7. An operation management method comprising:

detecting correlation destruction which is a variant of a correlation between metrics of two different servers among a plurality of servers executed on one or more processing devices in a system; and calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system, wherein the system includes a plurality of subsystems each of which is a group of one or more servers, and wherein the calculating includes calculating the evaluation value on the basis of whether subsystems to which the two servers with respect to the correlation on which the correlation destruction has been detected belong are the same or not, as the relation between the two servers.

8. The operation management method according to claim 7, wherein when calculating the evaluation value, in the case that the subsystems to which the two servers with respect to the correlation on which the correlation destruction has been detected belong are the same, the evaluation value is calculated using a coefficient greater than a coefficient used in the case that the subsystems are different.

9. The operation management method according to claim 7, wherein when calculating the evaluation value, in the case that, as the relation between the two servers, one server of the two servers with respect to the correlation on which the correlation destruction has been detected uses the other server without going through another server, the evaluation value is calculated using a coefficient greater than a coefficient used in the case that the one server uses the other server through another server.

10. The operation management method according to claim 9, wherein when calculating the evaluation value, it is determined whether the one server uses the other server without going through or going through another server on the basis of a type of each of the two servers with respect to the correlation on which the correlation destruction has been detected.

11. The operation management method according to claim 7, wherein when calculating the evaluation value, the correlation having the evaluation value being equal to or greater than a predetermined value among the correlations on which the correlation destruction has been detected between the servers is outputted.

12. The operation management method according to claim 7, further comprising calculating and outputting similarity between existence or non-existence of the correlation destruction for respective of a plurality of the correlations between the servers at the time of a failure and existence or non-existence of the correlation destruction therefore having the evaluation value being equal to or greater than a predetermined value for the inputted measurements of metrics.

13. A non-transitory computer readable storage medium recording thereon a program, causing a computer to perform a method comprising:

detecting correlation destruction which is a variant of a correlation between metrics of two different servers among a plurality of servers executed on one or more processing devices in a system; and calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system, wherein the system includes a plurality of subsystems each of which is a group of one or more servers, and wherein the calculating includes calculating the evaluation value on the basis of whether subsystems to which the two servers with respect to the correlation on which the correlation destruction has been detected belong are the same or not, as the relation between the two servers.

14. The non-transitory computer readable storage medium according to claim 13, wherein
when calculating the evaluation value, in the case that the subsystems to which the two servers with respect to the correlation on which the correlation destruction has been detected belong are the same, the evaluation value is calculated using a coefficient greater than a coefficient used in the case that the subsystems are different.

15. The non-transitory computer readable storage medium according to claim 13, wherein
when calculating the evaluation value, in the case that, as the relation between the two servers, one server of the two servers with respect to the correlation on which the correlation destruction has been detected uses the other server without going through another server, the evaluation value is calculated using a coefficient greater than a coefficient used in the case that the one server uses the other server through another server.

16. The non-transitory computer readable storage medium according to claim 15, wherein
when calculating the evaluation value, it is determined whether the one server uses the other server without going through or going through another server on the basis of a type of each of the two servers with respect to the correlation on which the correlation destruction has been detected.

17. The non-transitory computer readable storage medium according to claim 13, wherein
when calculating the evaluation value, the correlation having the evaluation value being equal to or greater than a predetermined value among the correlations on which the correlation destruction has been detected between the servers is outputted.

18. The non-transitory computer readable storage medium according to claim 13, further comprising calculating and outputting similarity between existence or non-existence of the correlation destruction for respective of a plurality of the correlations between the servers at the time of a failure and existence or non-existence of the correlation destruction therefore having the evaluation value being equal to or greater than a predetermined value for the inputted measurements of metrics.

19. An operation management apparatus comprising:
a correlation destruction detection means for detecting correlation destruction on a correlation between metrics of two different servers among a plurality of servers executed on one or more processing devices in a system; and
an evaluation value calculation means for calculating and outputting, when correlation destruction on a correlation between two servers has been detected for inputted measurements of metrics, an evaluation value of the correlation destruction on the basis of a relation between the two servers with respect to the correlation on which the correlation destruction has been detected in the system, wherein:
the system includes a plurality of subsystems each of which is a group of one or more servers, and
the evaluation value calculation means calculates the evaluation value on the basis of whether subsystems to which the two servers with respect to the correlation on which the correlation destruction has been detected belong are the same or not, as the relation between the two servers.

20. The operation management apparatus according to claim 1, wherein the evaluation value calculation unit calculates a score including the evaluation value on the basis of a relation of whether subsystems to which the two servers belong are the same or not.

* * * * *